United States Patent [19]

Smyth

[11] Patent Number: 4,774,832

[45] Date of Patent: Oct. 4, 1988

[54] ENGINE IDLING SPEED SENSING SYSTEM

[75] Inventor: Robert R. Smyth, Bloomfield Hills, Mich.

[73] Assignee: Eaton Corporation, Cleveland, Ohio

[21] Appl. No.: 118,590

[22] Filed: Nov. 9, 1987

[51] Int. Cl.$^4$ .................................. G01M 15/00
[52] U.S. Cl. .............................. 73/117.3; 74/DIG. 7
[58] Field of Search ........................ 73/117.3, 118.1; 123/352; 74/866, DIG. 7

[56] References Cited

U.S. PATENT DOCUMENTS

| | | | |
|---|---|---|---|
| 4,359,894 | 11/1982 | Ikeura et al. | 73/118.2 |
| 4,361,060 | 11/1982 | Smyth | 74/866 |
| 4,453,517 | 5/1984 | Kasiewicz | 123/352 |

Primary Examiner—Thomas P. Noland
Assistant Examiner—Robert P. Bell
Attorney, Agent, or Firm—A. E. Chrow

[57] ABSTRACT

An engine idling speed sensing system (34) is provided. System (34) includes circuitry (26) having memory portion (31) and is operative to receive a transmission signal (24); clutch signal (20); throttle signal (21); and engine speed signal (16), and process them and store the result in memory portion (31) according to their respective conditions to provide a stored idling speed value which can be used as a reference point for control for example of a clutch member (4) for enabling smooth engagement of change gears of an automatic transmission (6).

4 Claims, 1 Drawing Sheet

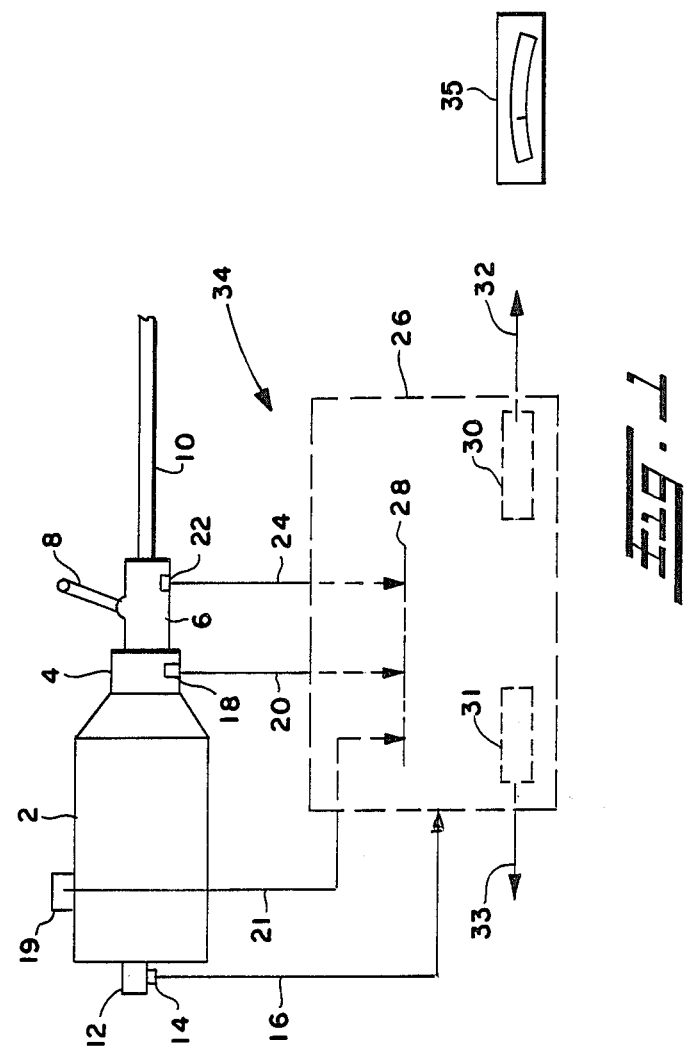

ENGINE IDLING SPEED SENSING SYSTEM

INTRODUCTION

This invention relates generally to a system for sensing idling speed of a vehicular engine and more particularly to such system that is adapted to store sensed engine idling speed value for improving operation of engine control parameters such as automatic clutch systems and the like.

BACKGROUND OF THE INVENTION

It is often advantageous to determine actual engine idling speed particularly for internal combustion engines used for powering vehicular travel in order to detect and record any changes that may be occurring in order to provide a reliable basis for operation of systems, such as automatic clutch systems, that may use engine idling speed as a factor in their mode of operation.

It is well known that variety of factors including as faulty parts, wear, variations in temperature and changes in combustion may cause engine idling speed to increase or decrease over a period of time and for such reason it is desirable to monitor and record engine idling speed so that it may be used as a reliable and accurate basis for control of other functions where required.

Although a variety of engine idling speed control systems have been devised in the past, none, excepting the sensing system disclosed in U.S. Pat. No. 4,359,894, stored the value of engine idling speed being sensed and even here the value is only stored when it is equal to or less than the value previously stored when the engine speed signal is proportional to engine speed or when the value is equal to or greater than the previously stored value when the engine speed signal is inversely proportional to the engine speed in addition to the fact that it relies solely upon monitoring the most closed throttle plate position rather than actual engine speed itself.

In view of the above, a need has existed to provide a system for monitoring and recording engine idling speed on a continuous basis in order to provide an advantageous basis for improving shifting for semi-automatic and automatic transmissions or the like and for other systems which use engine idling speed in their operation as well as for providing a visual display of engine idling speed as a means of indicating any change that may be occurring so that corrective adjustments may be made if desired.

SUMMARY OF THE INVENTION

Accordingly, it is an object of this invention to provide an engine idling speed sensing system.

It is another object of this invention to provide an engine idling speed sensing system that is operative to store engine idling speed being sensed to provide a more accurate basis for other systems associated with the engine which require knowledge of engine idling speed as a parameter in their operation.

BRIEF DESCRIPTION OF THE DRAWINGS

FIG. 1 shows a plan view of a block diagram of an embodiment of the sensing system of the invention.

BRIEF DESCRIPTION OF SOME PREFERRED EMBODIMENTS

In FIG. 1, sensing system 34 of the invention is operative to monitor and store idling speed of engine 2. Engine 2 is a vehicular internal combustion engine operative to power a drive train 10 for moving the vehicle. For purposes of brevity, drive train 10 is shown only in partial. Drive shaft 10 is rotationally driven by engine 2 which is drivingly connected to the vehicle's wheel by means of a differential or other suitable means not shown and well known to those skilled in the art.

Engine 2 is drivingly engaged with drive train 10 by transmission member 6 which in turn is in selectable engagement with engine 2 by means of clutch member 4.

Transmission member 6 has a selectable neutral condition at which it disengages driving engagement between input and output shafts of which the former is coupled to clutch member 4 and the latter is coupled to drive shaft 10. Transmission 6 may be manual, semi-automatic or completely automatic in operation and is shown with shift arm 8 enabling an operator to selectively engage the forward and reverse change gears available from transmission 6 as well as to place transmission 6 in the disengaged neutral condition.

Depending on the particular type of transmission involved, clutch member 4 may be of the well known frictional disc type utilized in manual transmissions requiring manual depression of a clutch pedal to disengage engine 2 from transmission 6 or it may be controlled by means of hydraulic and/or electronic circuitry to automatically engage and disengage the two from each other according to predetermined engine RPM—change gear shift points.

Engine idling occurs when the throttle control is in its idle condition with the transmission in a neutral condition and with the clutch in either the engaged or disengaged condition with the former more commonly referred to as the idling condition of the engine rather than the latter.

Sensing system 34 is provided by circuit means 26 processing a plurality of signals described as follows. Transmission member 6 is provided with a sensor member 22 operative to provide a signal 24 indicative of whether transmission 6 is an engaged change gear condition or whether it is in a disengaged neutral condition. Clutch member 4 is provided with a sensor member 18 operative to provide a signal 20 indicative of whether clutch 6 is in an engaged or disengaged condition. Engine 2 is provided with a sensor member 19 operative to provide a signal 21 indicative of whether the throttle control (not shown) is in an advanced or most closed or idle condition. Alternately, the accelerator pedal may be provided with a sensor member operative for the same purpose. Finally, the engine speed is monitored by a sensor member 14 operative to measure for example RPM of crank shaft 12 of engine 2 and provide a signal 16 indicative thereof. Any suitable sensor members well known to those skilled in the art may be used for sensor members 14, 18, 19 and 22.

Circuit means 26 is operative to receive transmission signal 24, clutch signal 20, throttle signal 21 and engine speed signal 16 and process them at least for an idling condition for which clutch 4 is in the disengaged condition but which may also include the clutch engaged condition or both provided of course that the transmission is in the neutral condition and the throttle is in its most closed or idle and not advanced condition.

Circuit means 26 includes at least memory portion 30 for the clutch disengaged condition that is operative to store engine idling speed value. As the engine is running, circuit means 26 receives engine speed signal 16 and when transmission signal 24 indicates that transmission 6 is in a neutral condition and throttle signal 20 indicates that the throttle is in its most cleared or retarded condition and clutch signal 20 indicates that clutch 4 is in a disengaged condition, circuit means 26 is operative to replace the previous value of engine speed stored in memory portion 30 and replace it with the value to speed signal 16 being monitored at the time as a new engine idling speed value.

Sensing system 26 may use exclusively, or in combination wth memory portion 30, a memory portion 31 that is operative to store engine idling speed value for the clutch engaged condition such that when transmission signal 24 indicates that transmission 6 is in a neutral condition and throttle signal 21 indicates the throttle in its most closed condition and clutch signal 20 indicates that clutch 4 is in an engaged condition, circuit means 26 is operative to replace the engine idling speed value stored in memory portion 31 with the value of engine speed signal 16 received by circuit means 26 at the time.

Since there are many ways well known to those skilled in the art by which circuit means 26 may be designed to provide the processing characteristics previously described, it is not described herein in detail. Circuit means 26 may, for example, be an electrical circuit means and include at least one "AND" gate shown generally by reference 28 that will only pass a signal for further processing when all of signals 20, 21 and 24 are of the nature desired, i.e. for memory portion 30, transmission signal 24 indicates a neutral condition, clutch signal 20 indicates a clutch disengaged condition and throttle signal 21 indicates a throttle most retarded in closed condition. In the event circuit means 26 is electrical, it may of course be either digital or analog with the former preferred for processing the various signals in digitized form.

Thus, the idling speed sensing system of the invention is operative to store the last measured idle speed so that the control point for clutch engagement can be adjusted relative the last recorded value rather than a typical value. Generally, it is desirable to set clutch operation slightly above idling condition for, if the control point is too high, excess wear of the clutch occurs and, if the control point is set too low, the idle governs internal to the engine alters the engine fuel rate tending to upset the clutch control action. More particularly, under light throttle conditions, it is desired to set the clutch operation control point such that the engine is held at about 50 rpm above idle as the clutch is engaged for temperature variation alone may cause engine idling speed to vary to 100 to about 150 rpm.

The engine idling speed values stored in memory portions 30 and 31 are respectively denoted by references 32 and 33. The sensing system of the invention may include means for visually displaying the stored value of engine idling speed by means such as display 35 which may be part of a display showing engine rotational speed generally and/or it may be used as the basis for determine clutch engagement and disengagement conditions for predetermined engine speed condition for vehicles employing semi-automatic or automatic transmissions.

What is claimed is:

1. An engine idling speed sensing system for a vehicular internal combustion engine having a throttle member for controlling engine speed, a transmission drivingly coupled to a drive train and having a selectable neutral disengaged condition and a plurality of engaged change gear conditions for causing the drive train to move the vehicle, and a clutch member selectively operable to engage the engine with and to disengage the engine from the transmission, said system comprising:
    (a) an engine speed sensor member operative to provide a signal indicative of engine speed,
    (b) a throttle position sensor member operative to provide a signal indicative of whether the throttle member is in an advanced or idle condition,
    (c) a clutch condition sensor member operative to provide a signal indicative of whether the engine is in the engaged or disengaged condition with the transmission,
    (d) a transmission condition sensor member operative to provide a signal indicative of whether the transmission is in the change gear engaged or neutral condition, and
    (e) circuit means including a memory portion for storing at least a stored clutch disengaged engine idling speed value and operative to process said engine speed, throttle condition, clutch condition and transmission condition signals and to replace said stored speed value with engine speed value sensed by said engine speed sensor as a clutch disengaged engine idling speed value whenever said throttle signal indicates that the throttle is in the idle condition and said clutch signal indicates that the clutch member is in the disengaged condition and said transmission signal indicates that the transmission is in the neutral condition.

2. An engine idling speed sensing system for a vehicular internal combustion engine having a throttle member for controlling engine speed, a transmission drivingly coupled to a drive train and having a selectable neutral disengaged condition and a plurality of engaged change gear conditions for causing the drive train to move the vehicle, and a clutch member selectively operable to engage the engine with and to disengage the engine from the transmission, said system comprising:
    (a) an engine speed sensor member operative to provide a signal indicative of engine speed,
    (b) a throttle position sensor member operative to provide a signal indicative of whether the throttle member is in an advanced or idle condition,
    (c) a clutch condition sensor member operative to provide a signal indicative of whether the engine is in the engaged or disengaged condition with the transmission,
    (d) a transmission condition sensor member operative to provide a signal indicative of whether the transmission is in the change gear engaged or neutral condition, and
    (e) circuit means including a memory portion for storing at least a stored clutch engaged engine idling speed value and operative to process said engine speed, throttle condition, clutch condition and transmission condition signals and to replace said stored speed value with engine speed value sensed by said engine speed sensor as a clutch engaged engine idling speed value whenever said throttle signal indicates that the throttle is in the idle condition and said clutch signal indicates that the clutch member is in the engaged condition and said transmission signal indicates that the transmission is in the neutral condition.

3. The sensing system of claim 1 wherein the circuit means includes a memory portion for storing a stored clutch engaged engine idling speed value and operative to process said engine speed, throttle condition, clutch condition and transmission condition signals and to replace said stored speed value with engine speed value sensed by said engine speed sensor as a clutch engaged engine idling speed value whenever said throttle signal indicates that the throttle is in the idle condition and said clutch signal indicates that the clutch member is in the engaged condition and said transmission indicates that the transmission is in the neutral condition.

4. The sensing system of claims 1, 2 or 3 including means for displaying the stored engine idling speed value

* * * * *